United States Patent
Hill et al.

(10) Patent No.: US 6,579,078 B2
(45) Date of Patent: Jun. 17, 2003

(54) MULTI-STAGE CENTRIFUGAL COMPRESSOR DRIVEN BY INTEGRAL HIGH SPEED MOTOR

(75) Inventors: M. Raymond Hill, Greensburg, PA (US); Milovan R. Grbic, Pittsburgh, PA (US)

(73) Assignee: Elliott Turbomachinery Co., Inc., Jeannette, PA (US)

(*) Notice: Subject to any disclaimer, the term of this patent is extended or adjusted under 35 U.S.C. 154(b) by 0 days.

(21) Appl. No.: 10/128,136

(22) Filed: Apr. 23, 2002

(65) Prior Publication Data

US 2002/0192089 A1 Dec. 19, 2002

Related U.S. Application Data (60) Provisional application No. 60/285,837, filed on Apr. 23, 2001.

(51) Int. Cl.[7] ............................. F04B 17/00; F04B 35/00
(52) U.S. Cl. ................. 417/423.7; 417/372; 417/423.3; 417/423.12; 417/423.11; 417/423.5; 417/228
(58) Field of Search ............................. 417/423.7, 372, 417/423.8, 423.12, 423.13, 423.11, 228, 423.5; 310/58, 60 R, 62, 63, 60 A, 64

(56) References Cited

U.S. PATENT DOCUMENTS

| | | | | |
|---|---|---|---|---|
| 3,951,573 A | * | 4/1976 | Dunning et al. | 417/423.13 |
| 4,125,345 A | * | 11/1978 | Yoshinaga et al. | 417/243 |
| 4,734,018 A | * | 3/1988 | Taniyama et al. | 417/423.4 |
| 5,638,796 A | * | 6/1997 | Adams et al. | 123/565 |
| 5,801,470 A | | 9/1998 | Johnson et al. | 310/156 |
| 5,857,348 A | * | 1/1999 | Conry | 62/209 |
| 5,957,667 A | * | 9/1999 | Epp | 417/271 |

FOREIGN PATENT DOCUMENTS

| | | |
|---|---|---|
| WO | WO0017524 | 3/2000 |

\* cited by examiner

*Primary Examiner*—Charles G. Freay
*Assistant Examiner*—William H. Rodriguez
(74) *Attorney, Agent, or Firm*—Webb Ziesenheim Logsdon Orkin & Hanson, P.C.

(57) ABSTRACT

A multi-stage centrifugal compressor with an integral high-speed motor for compressing air has a variable speed permanent magnet motor having electronically commutated stator coils surrounding a rotor carrying permanent magnets, wherein there is a gap between the coils and the rotor. The rotor has a magnetic steel rotor shaft rotatably supported at each end by pressurized oil lubricated hydrodynamic bearings. The stator coils have a plurality of stator wires extending longitudinally along the stator and continuing around the ends of the stator to define end turns. The compressor also has a plurality of compressor impellers mounted to turn with the rotor shaft and cooler for cooling the bearings, rotor and stator coils comprising a pump for introducing cooled oil into the bearings, said bearing configured so that oil exiting from the bearings splashes over the supported ends of the shaft and splashes over the end turns of the stator coils. There is a passageway through the stator for introducing pressurized air within a gap between the stator and the rotor during start up to maintain a positive pressure within the gap thereby displacing oil from the gap.

11 Claims, 5 Drawing Sheets

MULTI-STAGE CENTRIFUGAL COMPRESSOR DRIVEN BY INTEGRAL HIGH SPEED MOTOR

CROSS-REFERENCE TO RELATED APPLICATIONS

This application claims the benefit of U.S. Provisional Application No. 60/285,837, filed Apr. 23, 2001.

BACKGROUND OF THE INVENTION

1. Field of the Invention

Historically, small low flow rate compressors (below 800 ICFM (200 HP)) with discharge pressures below 150 psig were either screw or reciprocating type compressors. These screw and reciprocating type compressors were driven by small, induction type low speed (1800 to 3600 rpm) motors. Centrifugal compressors required high rotating speeds, this dictated use of gears to increase the drive speed to higher rotor speeds (approximately 5 to 20 times the drive speed). Initially, small centrifugal compressors were less efficient at low flow rates, had higher mechanical losses, and were not economical due to the requirement for speed increasing gears and additional bearings. Because of these problems, centrifugal compressors were not feasible for the low flow rate market segment.

2. Description of Related Art

As the centrifugal compressor technology became more efficient at these low flow rates, they were still burdened by the high cost and mechanical losses due to the speed increasing gears and additional bearings. This gave incentive to developing a direct drive high speed motor/compressor.

However, for years these speeds and power levels were not feasible. The advance in state of the art technology in power electronic components enabled the required high switching frequencies at the required power levels. But there were other problems such as being able to retain high density magnets onto a shaft that is rotating at an extreme speed. Composite fibers that have strength greater than metallic sleeves turned out to be the answer.

The purpose of this invention is to provide an improved small compact high speed motor integrally designed with compressor stages to directly drive the compressor to a desired high speed without the need of a speed increasing gear and additional bearings for the gears.

SUMMARY OF THE INVENTION

The present invention is directed to a multi-stage, such as a two-stage centrifugal compressor, driven directly by a high speed motor shaft that is integrally part of the rotor comprised of two impellers mounted directly on both ends of the motor shaft. The motor shaft which is supported on hydrodynamic bearings lubricated with oil is rotated by a stator powered by a high frequency inverter that is controlled electronically with a system that interacts with the power conversion system and Hall sensors.

In one embodiment of the invention a multi-stage centrifugal compressor with an integral high-speed motor for compressing air is comprised of:

a) a variable speed permanent magnet motor having electronically commutated stator coils surrounding a rotor carrying permanent magnets, wherein there is a gap between the coils and the rotor, said rotor having a magnetic steel rotor shaft rotatably supported at each end by pressurized oil lubricated hydrodynamic bearings, wherein the stator coils are comprised of a plurality of stator wires extending longitudinally along the stator and continuing around the ends of the stator to define end turns;

b) a plurality of compressor impellers mounted to turn with the rotor shaft, c) a pump for introducing cooled oil into the bearings for lubricating the bearings and for cooling the bearings, rotor and stator coils, said bearing configured so that oil exiting from the bearings splashes over the supported ends of the shaft and splashes over the end turns of the stator coils, and d) a passageway through the stator for introducing pressurized air during start up to maintain a positive pressure within the gap thereby displacing oil from the gap.

The invention is also directed to a method of starting a multi-stage centrifugal compressor with an integral high-speed motor, wherein the motor has a stator and a rotor rotationally supported therein defining a gap therebetween and wherein the rotor is supported at each end by hydrodynamic oil bearings, wherein the method is comprised of the steps of:

a) injecting pressurized air within the gap at a position between the ends of the rotor as the rotor begins to rotate to minimize the entry of oil from the bearings into the gap and b) when the rotor reaches a rotational speed sufficient to centrifugally expel oil outwardly from the rotor ends and away from the gap, discontinuing the injection of air.

Yet another embodiment of the invention is directed to a multi-stage centrifugal compressor with integral high-speed motor comprising:

a) variable speed permanent magnet motor having electronically commutated stator coils surrounding a rotor carrying permanent magnets, said rotor having a magnetic steel shaft rotatably supported by bearings, b) a plurality of compressor impellers mounted to turn with the rotor shaft, c) said rotor comprising:
1) square cross-section steel shaft defined by four faces parallel to the rotating axis of the shaft,
2) permanent magnets defined by a cylindrical surface and a flat surface and having a circular segment shaped cross-section secured to each of the four faces of the square steel shaft, said magnets arranged with alternating polarity, and
3) prestressed carbon graphite fiber reinforced plastic binding for holding the permanent magnets against the shaft.

The stator and inverter are water cooled utilizing finned heat exchangers. The gap between the rotor and the stator is controlled by inducing cool air to the gap 50 that purges the area from contaminates such as oil. The rotor shaft is cooled by bathing the ends adjacent to the magnets in cool oil. An alternate or enhancement to the shaft cooling is utilizing an axial hole through the rotor from the second stage impeller to the first stage impeller. Cool air from the second stage inlet is then passed through the shaft taking heat away. The motive force for the air flow is the differential pressure from the second stage inlet to the first stage inlet.

The rotor is constructed of four half moon shaped samarium cobalt magnets mounted on a square cross sectioned steel shaft and retained by means of a prestressed composite carbon graphite fiber winding.

DETAILED DESCRIPTION OF THE PREFERRED EMBODIMENTS

Figure 1:
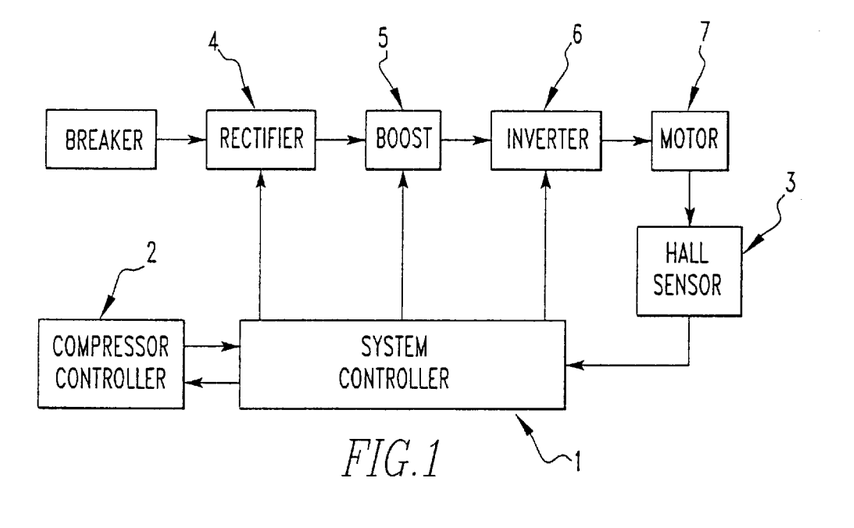
FIG. 1 is a schematic drawing showing the electrical system for providing electrical power to the motor during the startup and running mode.

FIG. 1 illustrates the relation between an electrical control system, including a system controller 1 and a compressor controller 2, and a power conversion system, including a rectifier 4, a boost 5, an inverter 6, and a motor 7. The electrical control system interacts with the power conversion system and Hall sensors 3 to provide motor startup as well as motor full speed conditions to accommodate the compressor load.

Figure 2:
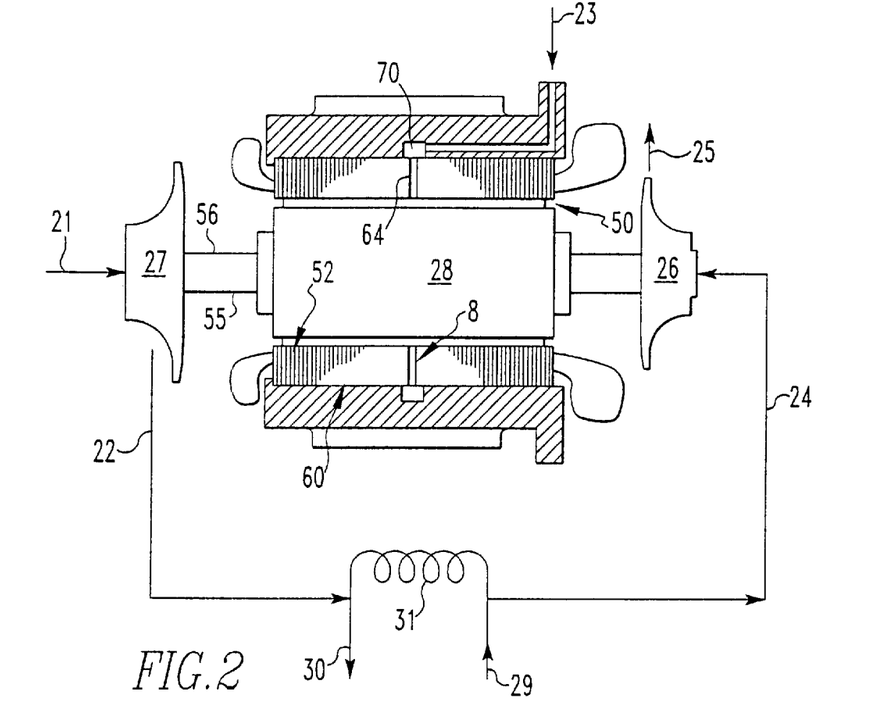
FIG. 2 is an illustration of the rotor with two compression stages, air path and intercooler.
Figure 3:
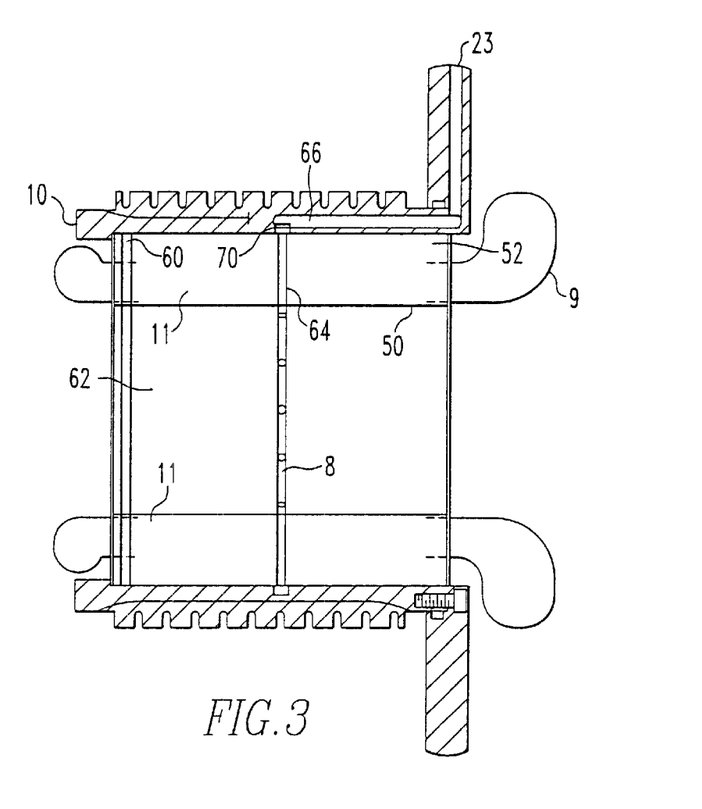
FIG. 3 is a split stator construction drawing.
Figure 4:
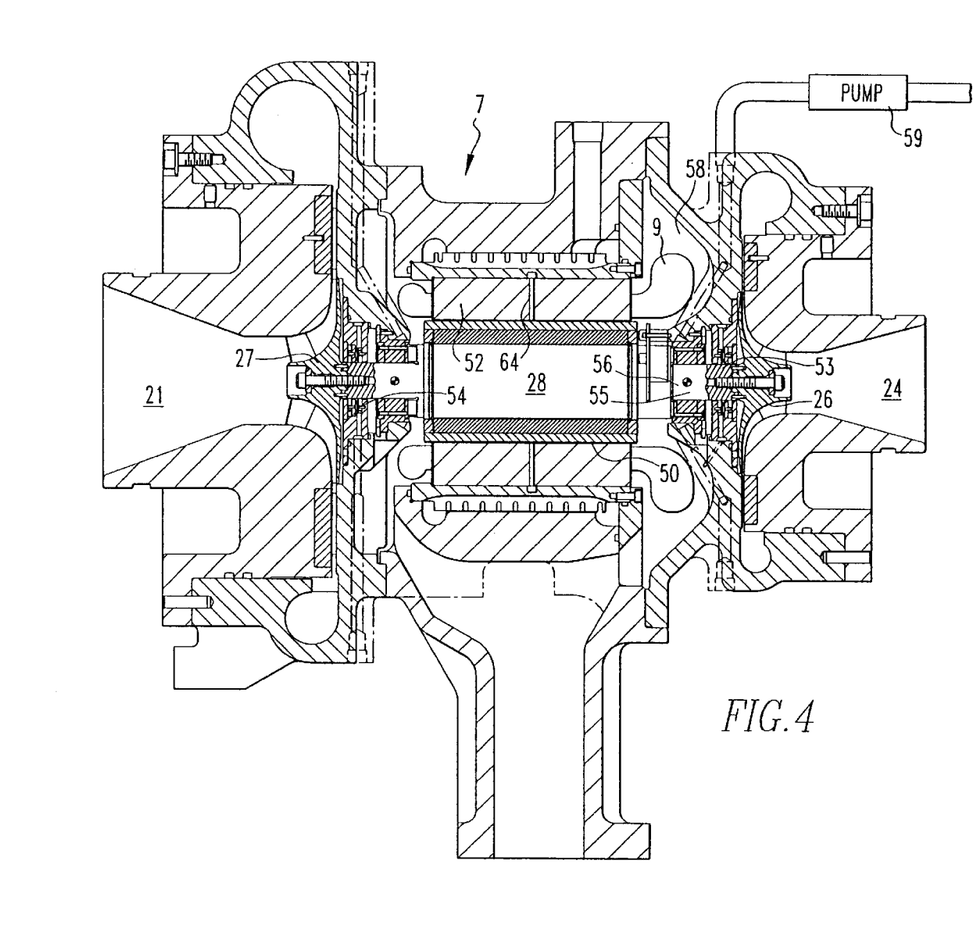
FIG. 4 is a cross-sectional view of an assembly illustrating details of FIG. 3.

FIGS. 2, 3 and 4 illustrate the rotor compressor configuration and air flow path with interstage air cooling. Atmospheric air enters, through a first stage inlet 21, a first centrifugal compressor stage 27 which compresses the air and causes the air to be heated. To increase the efficiency of the compression process, the air is cooled in a heat exchanger 31 before entering a second stage 26 through a second stage inlet 24. The heat exchanger utilizes cool water entering at 29 and exiting at 30 to exchange the heat from the air to the water. The second stage 26 further compresses the air 25 to the desired pressure level.

Pressurized air is introduced from an external source by line 23 to the gap 50 between the rotor 28 and the stator 52 to prevent oil from the bearings 53, 54 supporting the rotor 28 from entering the gap 50 when the rotor 28 is beginning to rotate at start-up. For purposes of this discussion, the arrangement related to bearing 53 will be described with the understanding that the arrangement related to bearing 54 will be similar.

Air forced into the gap 50 may be used to control the atmosphere between the rotor 28 and the stator 52 to prevent the entry of oil within the gap 50 or purge oil that may already be in the gap 50. After startup, when the rotor 28 is rotating at a speed sufficient that any oil contacting the rotor 28 will be centrifugally hurled from the rotor 28 and away from the gap 50, the pressurized air through line 23 should be discontinued. If pressurized air were to be supplied to the gap 50 at high rotational speeds, undesirable friction and heating of the rotor 28 and the stator 52 would occur.

High speed rotation of the rotor 28 under loaded conditions generates heat in the rotor due to windage, iron and copper losses, and harmonics. The rotor shaft 55 is cooled by bathing the ends 56 of the shaft 55 in cooled oil. Oil is pumped by pump 59 through oil passages 57 where it is introduced under pressure to bearing 53 for lubrication but also to remove heat from the bearing 53 and, as it splashes from the bearing 53 in a cavity 58 onto the end turns 9 of the stator 52, removes heat from the end turns 9 of the stator 52. It should be appreciated that pump 59 is shown schematically and provides oil to all of the rotor bearings in the assembly.

An alternate shaft cooling arrangement (not shown) is supplying cool air from the second stage inlet 24 through a hole in the shaft of the rotor 28 to the first stage inlet 21. The motive force for the air is the differential pressure of the second stage inlet 24 which is higher than the pressure of the first stage inlet 21. This arrangement can also be used in conjunction with the oil cooling.

Directing attention to FIGS. 3 and 4, a synchronous permanent magnet motor 7 is used to drive the compressor stages 26 and 27. The motor 7 is comprised of the stator 52 and the rotor 28. The stator 52 is manufactured using electrical steel laminated disks 60 that are stacked together, as shown in FIG. 3. Laminated material for the disks 60 (two shown) is of high quality thereby resulting in low losses. This stack of the stator 52 contains three-phase distributed wye connected windings in twenty-four stator slots. The stator 52 is split in the middle to accommodate a high temperature plastic spacer 8, in place of one or more disks 60, having spoke passageways 64 extending radially to supply pressurized air through line 23 from the stator 52 OD (outer diameter) to the gap 50 between the stator 52 ID (inner diameter) and the rotor 28 OD. This air is used to remove or to prevent from entering any oil in the gap 50. Air is provided through line 23 into a passageway 66 extending through a water-cooled jacket 10, which is around the disks 60, to an annulus 70 extending around the outside of the stator 52. From there the air is distributed through the spoke passageways 64 into the gap 50.

Openings between the wires of the end turn 9 wires adjacent to the gap 50 are provided for oil drainage. On the outer periphery of stator 52 is mounted the water-cooled jacket 10 that provides cooling for the heat generated by the copper and iron losses created in the stator 52. Therefore, cooling occurs by both the oil flow through the bearings 54 and flow of water through the jacket 10.

Figure 5:
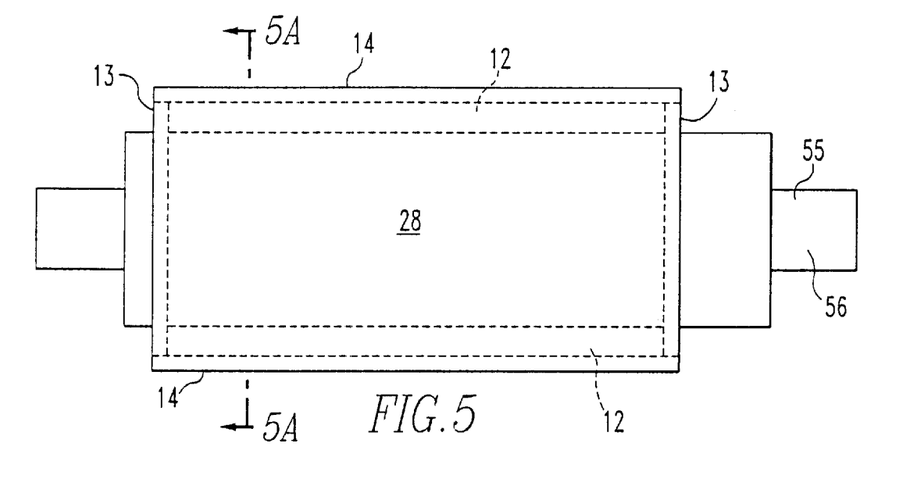
FIG. 5 is a rotor construction drawing.
Figure 5A:
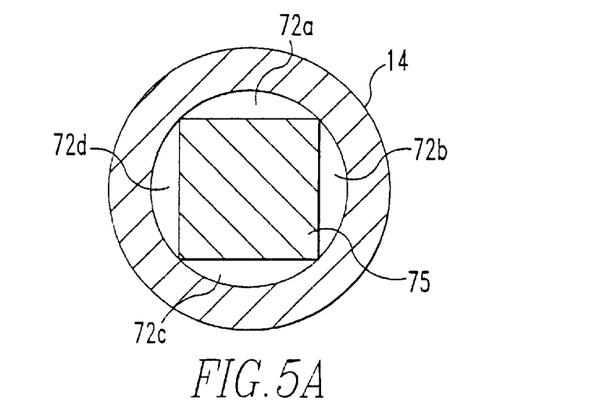
FIG. 5A is a section view taken along lines "5A—5A" in FIG. 5.

The rotor, as shown in FIGS. 5 and 5A, has permanent magnets 12 made of rare earth samarium cobalt. There are four poles per rotor. The magnet geometry is a half moon shape to minimize magnet end losses and minimize stress levels. The half moon shaped magnets 72a–72d are mounted on a square cross sectioned steel shaft 75 which is used to complete the conductive field. The magnets are encased axially with non-conductive titanium end caps 13. Titanium allows sensing of the rotor magnets stray fields by Hall sensors without shorting the magnets. The rotor magnets are retained radially to the shaft with a prestressed composite winding 14. This composite winding 14 is a high strength, low electric conductivity and high resistance carbon graphite fiber composition. The prestressed condition of the composite fiber winding prevents magnet lift-off from the shaft which could damage the magnets during operation.

The input voltage to the power stage can vary from 380 V to 575 V, 50 or 60 Hz. The AC input voltage is converted by the half controlled rectifier circuit to a DC voltage whose levels can be changed by the boost phase. The DC voltage is changed to an AC voltage with desired magnitude and frequency by the inverter stage. The stator windings are connected to the inverter output.

Figure 6:
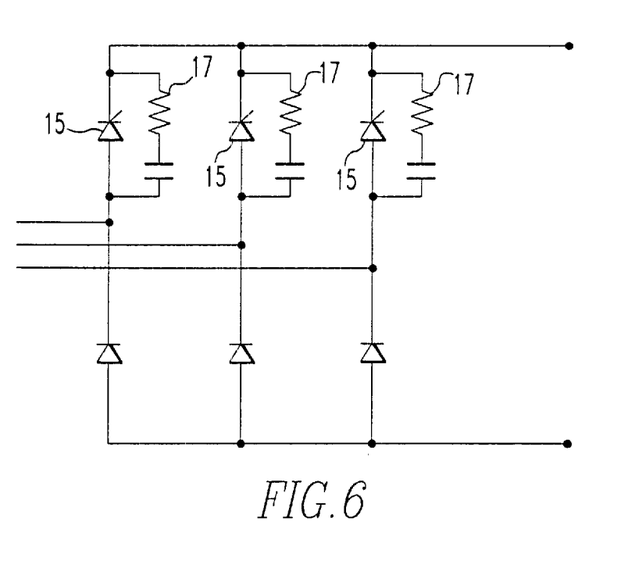
FIG. 6 schematically illustrates a rectifier circuit for converting the AC input to a DC voltage.

The three phase, half-controlled thyristor shown in FIG. 6 is used to convert the input voltage to a DC voltage level.

DC voltage level depends on the input voltage and is 1.45 higher then the rms value of the input voltage. A half-controlled thyristor is made of three thyristors 15 and three diodes 16. Three snubber circuits 17, each consisting of series RC circuits, are connected to the anodes and cathodes of the three thyristors 15. The RC components have a low power rating due to the small voltage slope transient increase imposed by the half-controlled rectifier compared to the full-controlled version. A soft start is used to initially charge the DC capacitor bank that is connected to the half-controlled thyristor output. The DC capacitor fixed voltage is maintained through the first stage startup.

Motor startup is deployed in two stages. Both stages use conventional six-step feedback sensor decoding. During each of the six steps, two out of six IGBT (insulated gate bipolar transistors) switches 18, as shown in FIG. 6, are normally turned on. To limit the current as the motor accelerates, one of the switches is PWM (pulse-width modulated) at 18 kHz. Each time the commutation state changes, the switch that is modulated is changed, resulting in even switching loss distribution among the six IGBTs. The duty cycle is at 100% when the motor reaches about 80% of nominal speed. At this point the control switches to the second mode.

Figure 8:
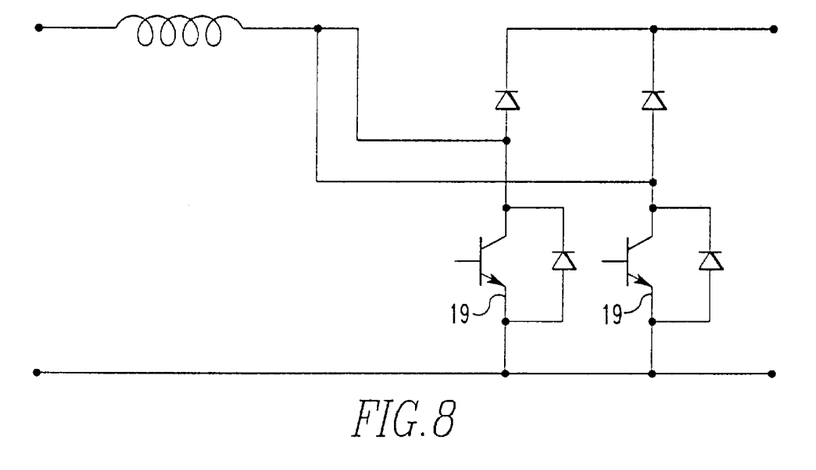
FIG. 8 illustrates a boost chopper circuit composed of two IGBT switches used to step-up voltage level on the DC bus.

The second mode requires control of the step-up (boost) circuit shown in FIG. 8. At the end of the first startup mode DC, the bus is already charged to a level dependent on the AC input rmns voltage value and the motor is at 80% of the desired speed. To further increase motor speed, it is necessary to increase the DC bus voltage level. The voltage level is changed by changing the switch duty ration, which is refined as the ration of the on duration to the switching time period. In the PWM switching mode the switch control signal, which controls the state (on or off) of the switch, is generated by comparing a signal-level control voltage with a repetitive waveform. The frequency of the repetitive waveform with a constant peak, a sawtooth shape, establishes the switching frequency.

Figure 7:
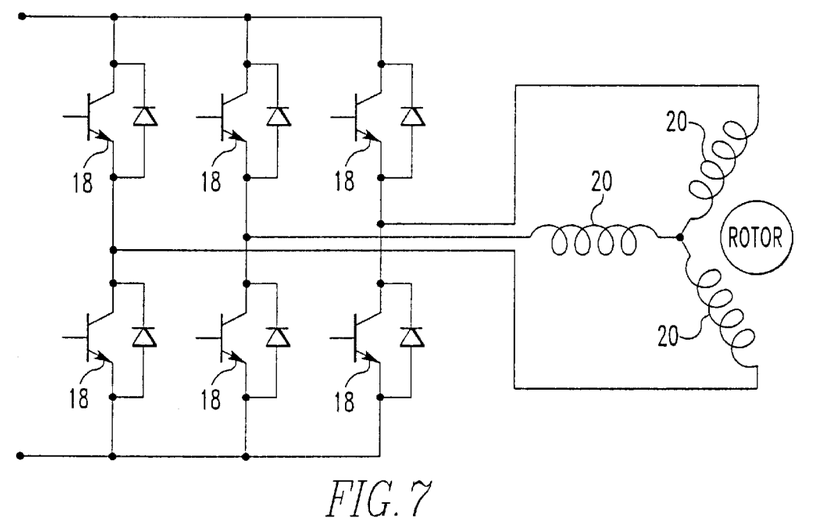
FIG. 7 schematically illustrates the inverter circuit compose of six IGBT switches used to communicate the current to the motor during the startup and running mode.

During the boost mode, the voltage controlled IGBT circuit shown in FIG. 7 is in a six-step control mode which obtains the increase of the motor speed to a desired nominal value. Current flows through the two motor phase windings 20 at any time depending on the on/off setting of the IGBT switches. Each of the six IGBT switches in on for 120° and off for 60° and is regulated according to a lookup table. During the 120° on time, a positive voltage is applied. During the gap of 60°, energizing is stopped. Energizing is then conducted in the same manner in the other two phases. A variable timing of energizing is applied in respective three phases so that there is a difference of 120° between phases. This makes it possible to drive a motor when a magnetic rotation field is generated.

A position detecting circuit, the Hall sensors 3 shown in FIG. 1, is based on the Hall effect characteristics. Three Hall sensors are mounted 60° apart and designed to detect the stray magnetic fields from the motor rotor poles. A positive signal voltage is latched when a rotor south pole magnet passes by the sensor; otherwise the signal is zero. The Hall effect pickups enable a closed loop commutation of the inverter and motor stator windings.

When the motor is at a nominal speed, motor current is optimized by controlling the current phase advance to related induced back EMF (electro-motive force) in the stator winding. A back EMF zero crossing is used as a reference point for the current winding injection. The Hall sensors detect the back EMF zero crossing.

The system controller performs all control functions including: motor startup, PWM control, boost control, six step control, motor position detection, current optimization and speed control. The compressor controller controls start and stop functions. A serial link communication is established between the compressor and motor controllers. Motor control setpoints are passed from the compressor controller to the motor controller and they are: desired speed set point, low speed alarm and trip setpoint, high speed alarm and trip setpoint, maximum amperage alarm and trip setpoint, lead angle and low DC bus alarm setpoint. An alarm action is activated when a monitored parameter has reached an unacceptable but not critical level of operation. A trip action is activated when a monitored parameter has reached a critical and unsafe level of operation. The system controller performs all trip functions. Motor/controller analog input readings are passed to the compressor controller for display and they are speed, amperage, DC bus voltage, and motor power.

While specific embodiments of the invention have been described in detail, it will be appreciated by those skilled in the art that various modifications and alternatives to those details could be developed in light of the overall teachings of the disclosure. The presently preferred embodiments described herein are meant to be illustrative only and not limiting as to the scope of the invention which is to be given the full breadth of the appended claims and any and all equivalents thereof.

The invention claimed is:

1. A multi-stage centrifugal compressor with an integral high-speed motor for compressing air comprising:
   a) a variable speed permanent magnet motor having electronically commutated stator coils surrounding a rotor carrying permanent magnets, wherein there is a gap between the coils and the rotor, said rotor having a magnetic steel rotor shaft rotatably supported at each end by pressurized oil lubricated hydrodynamic bearings, wherein the stator coils are comprised of a plurality of stator wires extending longitudinally along the stator and continuing around the ends of the stator to define end turns;
   b) a plurality of compressor impellers mounted to turn with the rotor shaft,
   c) a pump for introducing cooled oil into the bearings for lubricating the bearings and for cooling the bearings, rotor and stator coils, said bearing configured so that oil exiting from the bearings splashes over the supported ends of the shaft and splashes over the end turns of the stator coils, and
   d) passageway through the stator for introducing pressurized air during start up to maintain a positive pressure within the gap thereby displacing oil from the gap.

2. The compressor according to claim 1 further comprising means for terminating the introduction of pressurized air to the gap when the motor has reached a predetermined speed.

3. The compressor according to claim 1, wherein compressed air from an external source is introduced into the gap during start up.

4. The compressor according to claim 1, wherein the stator coil is supported by laminations and wherein the passageway extends through the stator coil laminations midway between the axial ends of the rotor shaft.

5. The compressor according to claim 1, wherein the rotor shaft has an axial hole extending therethrough to accept oil for cooling.

6. A multi-stage centrifuigal compressor with integral high-speed motor comprising a) variable speed permanent magnet motor having electronically commutated stator coils surrounding a rotor carrying permanent magnets, said rotor having a magnetic steel shaft rotatably supported by bearings, b) a plurality of compressor impellers mounted to turn with the rotor shaft, c) said rotor comprising:
1) said steel shaft having a square cross-section defined by four faces parallel to the rotating axis of the shaft,
2) said permanent magnets defined by a cylindrical surface and a flat surface and having a circular segment shaped cross-section secured to each of the four faces of the square steel shaft, said magnets arranged with alternating polarity, and
3) prestressed carbon graphite fiber reinforced plastic binding for holding the permanent magnets onto the shaft.

7. The compressor according to claim 6 further comprising a hall effect magnetic sensor proximate to the rotor for detecting a change in polarity of the magnetic field of the rotor as a corner of the square cross-sectioned shaft rotates past the sensor.

8. The compressor according to claim 6 wherein the magnets are positioned on the shaft to define a continuous cylindrical surface.

9. The compressor according to claim 8 wherein edges of each magnet are positioned adjacent to the edges of magnets having opposite polarity.

10. The compressor according to claim 8 wherein edges of the magnets defined by the cylindrical surface thereof and the flat surface thereof abut the edges of magnets of opposite polarity.

11. A method of starting a multi-stage centrifugal compressor with an integral high-speed motor, wherein the motor has a stator and a rotor rotationally supported therein defining a gap therebetween and wherein the rotor is supported at each end by hydrodynamic oil bearings, wherein the method is comprised of the steps of:

a) injecting pressurized air within the gap at a position between the ends of the rotor as the rotor begins to rotate to minimize the entry of oil from the bearings into the gap and b) when the rotor reaches a rotational speed sufficient to centrifugally expel oil outwardly from the rotor ends and away from the gap, discontinuing the injection of air.

* * * * *

UNITED STATES PATENT AND TRADEMARK OFFICE
CERTIFICATE OF CORRECTION

PATENT NO. : 6,579,078 B2
DATED : June 17, 2003
INVENTOR(S) : M. Raymond Hill et al.

It is certified that error appears in the above-identified patent and that said Letters Patent is hereby corrected as shown below:

Column 5,
Line 28, "rmns" should read -- rms --.

Column 6,
Line 66, "centrifuigal" should read -- centrifugal --.

Signed and Sealed this

Twenty-fifth Day of November, 2003

JAMES E. ROGAN
*Director of the United States Patent and Trademark Office*